United States Patent
Hirayama et al.

(10) Patent No.: US 6,669,762 B2
(45) Date of Patent: Dec. 30, 2003

(54) AIR TRAP FOR LIQUID CIRCULATION LINE

(75) Inventors: Toshikazu Hirayama, Osaka (JP); Daisuke Ueno, Osaka (JP)

(73) Assignee: Nipro Corporation, Osaka-fu (JP)

( * ) Notice: Subject to any disclaimer, the term of this patent is extended or adjusted under 35 U.S.C. 154(b) by 62 days.

(21) Appl. No.: 10/024,180

(22) Filed: Dec. 21, 2001

(65) Prior Publication Data

US 2002/0121195 A1 Sep. 5, 2002

(30) Foreign Application Priority Data

Dec. 28, 2000 (JP) ........................................ 2000-399888

(51) Int. Cl.$^7$ ................................................ B01D 19/00
(52) U.S. Cl. ........................................ 96/219; 210/188
(58) Field of Search ........................... 210/188; 96/179, 96/204, 219, 155; 95/241, 260

(56) References Cited

U.S. PATENT DOCUMENTS

| 3,273,319 A | * | 9/1966 | Jones et al. |
| 3,631,654 A | * | 1/1972 | Riely et al. |
| 4,004,587 A | | 1/1977 | Jess |
| 4,031,891 A | | 6/1977 | Jess |
| 4,302,223 A | * | 11/1981 | Booth et al. |
| 4,319,996 A | * | 3/1982 | Vincent et al. |
| 4,336,036 A | * | 6/1982 | Leeke et al. |
| 4,341,538 A | * | 7/1982 | Vadnay et al. |
| 4,459,139 A | * | 7/1984 | von Reis et al. |
| 4,484,936 A | * | 11/1984 | Sakai |
| 4,615,694 A | * | 10/1986 | Raines |
| 4,828,587 A | * | 5/1989 | Baurmesiter et al. |
| 4,976,754 A | * | 12/1990 | Edelstein et al. |
| 5,000,764 A | * | 3/1991 | Oshiyama et al. |
| 5,439,587 A | * | 8/1995 | Stankowski et al. |
| 6,190,546 B1 | * | 2/2001 | Agner |
| 6,342,092 B1 | * | 1/2002 | Lichon et al. |
| 6,402,821 B1 | * | 6/2002 | Matsuyama |
| 6,432,178 B2 | * | 8/2002 | Lichon et al. |
| 6,530,983 B2 | * | 3/2003 | Chybin et al. |
| 2002/0121195 A1 | * | 9/2002 | Hirayama et al. |

FOREIGN PATENT DOCUMENTS

| DE | 1816972 A | 7/1969 |
| DE | 4219966 A1 | 1/1993 |
| JP | 09094402 | 4/1997 |

OTHER PUBLICATIONS

C. Dickenson: "Filters and Filtration Handbook"; 1997, Elsevier Advanced Technology, Oxford, GB XP002193660; p. 36.

* cited by examiner

Primary Examiner—Duane S. Smith
(74) Attorney, Agent, or Firm—Birch, Stewart, Kolasch & Birch, LLP

(57) ABSTRACT

An air trap comprises an air reservoir to be arranged in a liquid circulation line, and a hydrophilic filter which permits a liquid to permeate but does not permit gas bubbles to permeate, and which is arranged in the air reservoir to separate an upstream side of the liquid circulation line from the downstream side of the liquid circulation line. The filter has pores which meet conditions defined by equation: $P<4h/d$, where P represents a gas pressure, d is a diameter of the pores of the filter, and h is a surface tension of the liquid.

8 Claims, 3 Drawing Sheets

P: Pressure on the side of gas
Ph: pressure due to surface tension
d: pore size of filter

BACKGROUND ART

AIR TRAP FOR LIQUID CIRCULATION LINE

BACKGROUND OF THE INVENTION

The present invention relates to an air trap for liquid circulation line. More particularly, it relates to an air trap for a liquid circulation line for circulating a liquid such as a coolant or the like, capable of trapping bubbles in the liquid circulating through the liquid circulation line to prevent the bubbles produced in the circulation line from entering into a circulating pump.

Generally, cooling fans have been used for cooling systems of CPUs in personal computers or the like. Alternatively, water-cooled cooling systems are partially used in personal computers or the like because of their higher heat efficiency.

In such personal computers, large-sized products or desktop type personal computers may be equipped with a circulating pump with a large capacity, and thus they have no trouble with the capacity of the pump. In contrast therewith, small-sized products such as, for example, notebook-size personal computers have limits in size and weight and thus it is obliged to use a circulating pump with a small capacity. However, such small sized water-cooling systems have difficulties in constant discharge rate of the pumps because of formation of bubbles in the circulation line. In order to ensure the constant discharge rate, it is required to provide any mechanism for removing such bubbles from the coolant. For this purpose, there have been used gravity type air traps as shown in FIG. 5 or filter type air traps as shown in FIG. 6. However, the gravity type air trap does not function well if a notebook-size personal computer equipped with such an air trap is used under the circumstances turned upside down. On the other hand, the filter type air trap of FIG. 6 has a problem in that the coolant in the circulation line decreases in quantity by evaporation during long use.

SUMMARY OF THE INVENTION

It is therefore an object of the present invention to provide an air trap for liquid circulation line, which is capable of stabilizing a discharge rate of a pump by trapping bubbles produced in a liquid circulating in a liquid circulation line to prevent the bubbles from entering into a pump.

The present inventors have intensively researched in order to achieve the above object, and found that by trapping bubbles generated in a coolant in a part of the circulation line, instead of removing therefrom, it is possible to keep an amount of the coolant in the circulation line constant as well as to prevent the bubbles from entering into the pump.

According to the present invention, there is provided an air trap for liquid circulation lines, comprising an air reservoir provided in a liquid circulation line, and a hydrophilic filter arranged in said air reservoir to separate an upstream of a flow path therein from a downstream side thereof, said filter having liquid-permeability and air bubble-impermeability. In that case, it is preferred to use a hydrophilic filter having pores which meet conditions defined by the following equation (1):

$$P < 4h/d \quad (1)$$

where P represents a gas pressure, d is a diameter of the pores of the filter, and h is a surface tension of the liquid.

The air reservoir is composed of an internal space of a container arranged in and spaced from a housing, which has at a proximal end thereof a liquid inlet for liquid from the liquid circulation line and at a distal end thereof a liquid outlet for liquid to the liquid circulation line, and communicated with the liquid inlet at a distal end thereof. The container is provided in its wall with at least one window to allow the internal space thereof to communicate with the outer space formed between the housing and the container. The container is provided at its wall with at least one filter so as to close the at least one window thereof with the filter.

Alternatively, the air reservoir may be composed of an internal space of a flat housing provided in opposite flat walls thereof with an inlet for a liquid from the liquid circulation line and an outlet for a liquid to the circulation line respectively. The housing is further provided in the interior thereof with a filter so that the internal space thereof is partitioned to two spaces, i.e., a liquid inlet side and a liquid outlet side.

The present invention will become more fully understood from the detailed description given hereinbelow and the accompanying drawings which are given by way of illustration only, and thus are not limitative of the present invention.

DETAILED DESCRIPTION OF THE INVENTION

Figure 1:
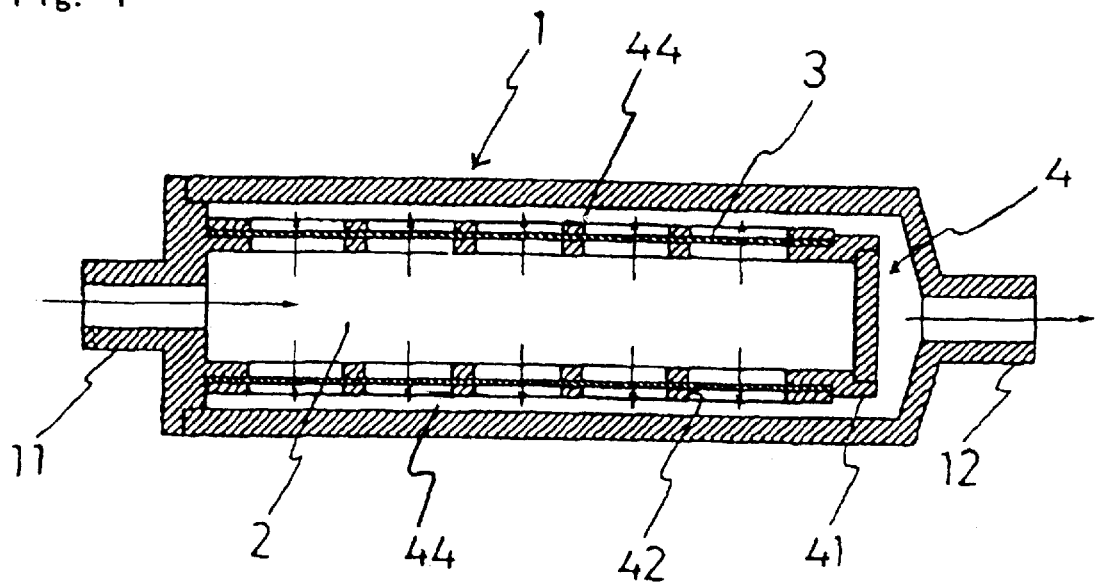
FIG. 1 is a longitudinal section of an embodiment according to the present invention.
Figure 2:
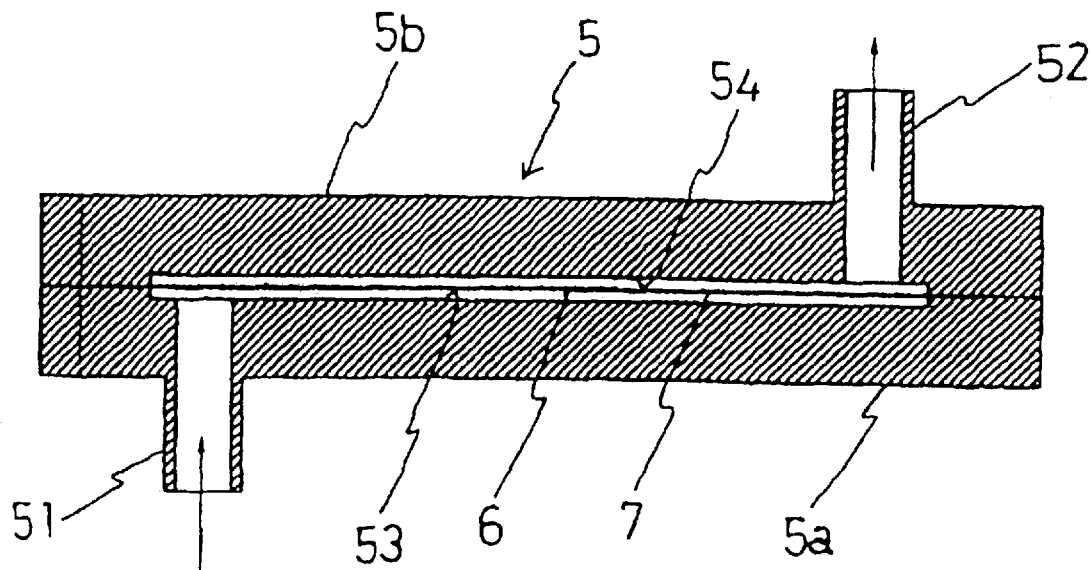
FIG. 2 is a longitudinal section of another embodiment according to the present invention.

As illustrated in FIGS. 1 and 2, an air trap of the present invention comprises an air reservoir (2) to be arranged in a liquid circulation line (not illustrated in the drawing), and a hydrophilic filter (3) which permits a liquid to permeate but does not permit gas bubbles to permeate and which is arranged in the air reservoir to separate an upstream side of the liquid circulation line from the downstream side of the liquid circulation line.

Figure 3:
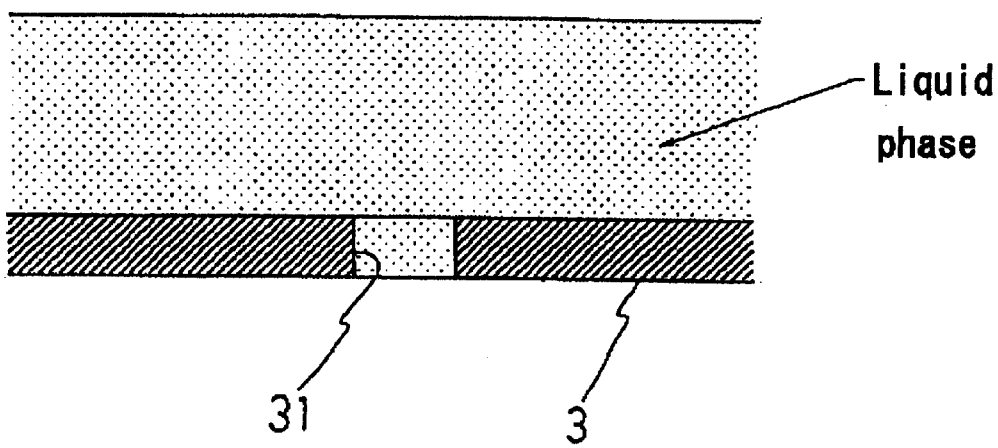
FIG. 3 is a diagram illustrating the principle of the air trap according to the present invention.
Figure 4:
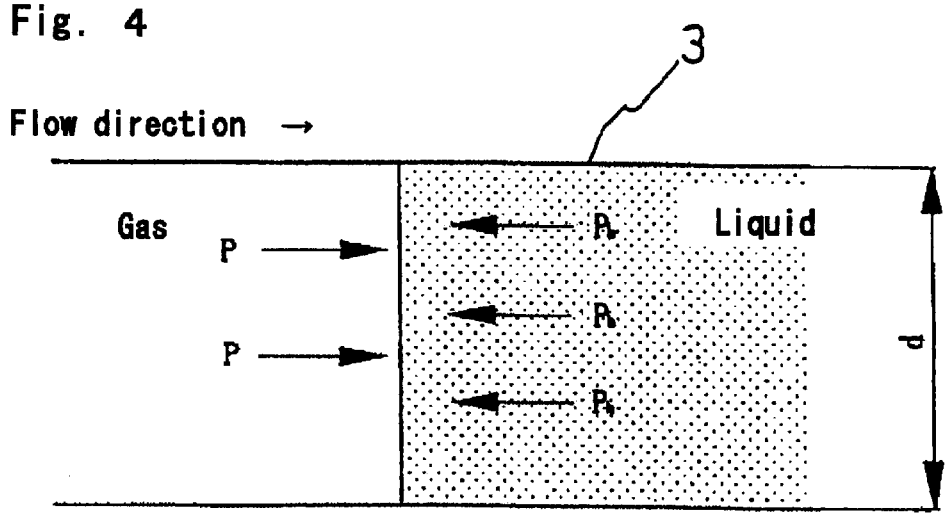
FIG. 4 is a diagram illustrating the principle of the air trap according to the present invention.
Figure 5:
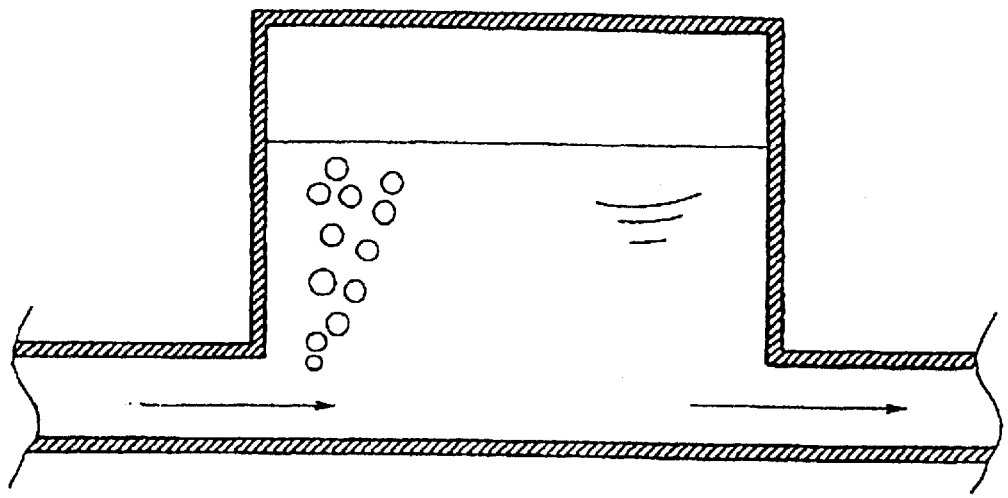
FIG. 5 is a longitudinal section of an example of conventional air traps.

The filter (3) has a number of pores (31), which resemble capillaries, as shown in FIG. 3. If a liquid phase is separated from a gas phase by the filter (3), the pores (31) of the filter (3) are filled with the liquid and the filter (3) gets a pressure P on its one surface from the side of the gas and a pressure $P_h$ on the opposite surface from the side of the liquid (a pressure due to surface tension), as shown in FIG. 4. In order for the gas to cause the liquid to push out of the pores (31), the gas is required to have a pressure higher than the surface tension of the liquid. A pressure equivalent to the surface tension of a liquid is generally called as a bubble point pressure. Assuming that the bubble point pressure is $P_b$; the pore diameter of the filter (3), d; and the surface tension of the liquid flowing through the liquid circulation line, h, the bubble point pressure $P_b$ is related to d and h by the following equation:

$$P_b = k4h \cos\theta/d$$

where k is a correction factor, and θ is a contact angle between the liquid and the filter. If the liquid is water, the above relationship is approximately expressed by the following equation:

$$P_b = 4h/d$$

Accordingly, if the pressure P on the side of the gas phase is lower than the bubble point pressure $P_b$, ($P<P_b$), the gas in the liquid can be trapped by the filter (3). For this reason, the filter (3) used in the air trap of the present invention has pores (31) which satisfies the requirement of $P<P_b$, namely, the conditions as defined by the equation: $P<4h/d$. For example, assuming that a pump to be used has a discharge pressure P of 10 kPa and the liquid has a surface tension of 73.21 mN/m, the diameter h of the pores should be smaller than 29.3 µm (h<29.3 µm).

In the air trap shown in FIG. 1, the air reservoir (2) is composed of an internal space of a container (4) arranged in the housing (1) and spaced therefrom to form a space (44) between them. The housing (1) has at a proximal end thereof a liquid inlet (11) for the liquid from the liquid circulation line and at a distal end a liquid outlet (12) for the liquid to the liquid circulation line. The container (4) is closed at a distal end thereof but opened at a proximal end thereof to form a liquid communication with the liquid inlet (11). The container (4) is further provided in its side wall with at least one window (42) covered with the filter (3). An area of the window (42), i.e., an effective filtration area of the filter (3) is determined in consideration of a fluid resistance of the filter (3) and reduction in the filtering area caused by the trapped air, so that the liquid pressure acting on the filter, that is, the pressure on the side of the gas can not exceed the liquid pressure at the liquid inlet (11).

As a material for forming the filter (3), there may be used cellulose, ultra-high-molecular-weight polyethylene, polyethylene, polymethylmethacrylate, polypropylene, polyvinyl chloride, polycarbonate, polytetrafuloroethylene, polyvinylidene fluoride, polyester, polyamide, metallic fiber and the like. The liquid, which is circulated through the liquid circulation line by the pump (not illustrated in the drawing), enters into the air reservoir (2) through the liquid inlet (11) of the air trap, passes through the filter (3) and flows out of the liquid outlet (12) through the outer space formed between the container (4) and the housing (1). If the gas bubbles are contained in the liquid flowing into the air reservoir (2), the bubbles are trapped by the filter and remain in the air reservoir (2). Therefore, there is no possibility for the bubbles to push out through the air trap.

In this embodiment, the container (4) is not necessarily closed at the distal end (41) as shown in FIG. 1. Alternatively, the container (4) may be provided at the distal end (41) thereof with a window (42) covered with a filter (3).

The air trap shown in FIG. 2 comprises a flat housing (5) provided with an air reservoir (6). The air reservoir (6) is constituted by an internal space of the flat housing (5), which is provided with a liquid inlet (51) for the liquid entering into the internal space from a liquid circulation line and a liquid outlet (52) for the liquid flowing out to the liquid circulation line. The inlet (51) and outlet (52) are provided oppositely from each other, vertically and axially symmetric to each other relative to the plane surface of the housing (5), respectively. The internal space of the housing (5) is partitioned by a filter (7) into two spaces, i.e., a space on a liquid inlet side and a space on a liquid outlet side. However, the liquid inlet (51) and the liquid outlet (52) are not necessarily arranged vertically and axially symmetric to each other, in so far as they are arranged oppositely from each other relative to the plane surface of the housing (5). The housing (5) having a configuration as shown in FIG. 2 may be constructed, for example, by preparing two identical flat members (5a), (5b) each having a recess (53), (54) formed in one side thereof and a cylindrical projection serving as a liquid inlet (51) or a liquid outlet (52) formed in the other side thereof, mating the two flat members (5a), (5b) together with a filter (7) placed between them so that the liquid inlet (51) and the liquid outlet (52) are located axially symmetric to each other, and then welding the flat members (5a) and (5b). In that case, the recessed portions (53) and (54) are faced each other to form a space partitioned by the filter into an air reservoir (6) and a space communicated with the liquid outlet (52).

The depth of the recessed portion (53) forming the air reservoir (6) is determined so that the liquid in the recessed portion (53) always come into contact with the whole area of the filter (7) to avoid the dependency of the flow rate of the liquid passing through the filter (7) on the installation mode of the air trap (specifically whether the recessed portions (53), (54) are set vertically or horizontally). The depth of the recessed portion ranges, preferably from about 0.1 to about 4.0 mm and, more preferably, from 0.5 to 2.0 mm.

Examples and Comparative Examples

Figure 6:
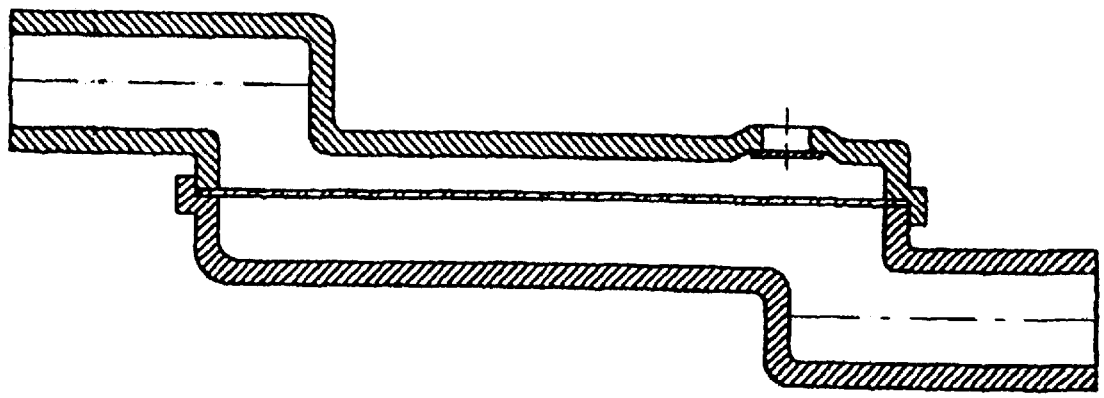
FIG. 6 is a longitudinal section of another example of conventional air traps.

There were prepared five air traps for each of the constructions shown in FIG. 2 and FIG. 6. Each air trap was set in a liquid-circulation line, which was then operated to circulate the liquid in the circulation line. After continuous operation of each circulation line for 24 hours, measurements were made on a flow rate of the liquid every one minute 5 times. The measurements of the flow rate were carried out under the following conditions:

An inlet temperature of the liquid at the liquid inlet: 49° C.

Pore size of the filter: 5 µm

Depth of the recessed portion (53): 1.0 mm

Discharge pressure of the pump: 5 kPa.

The results are shown in Table 1. In case of the air trap of Comparative Example 2, the circulation of the liquid was stopped after elapse of 10 days.

As can be seen from the results shown in Table 1, the air traps according to the present invention possess significantly stable the flow rates.

TABLE 1

|  | Flow rate | | | | | Average |
|---|---|---|---|---|---|---|
| Initial value | 60.0 | 59.0 | 61.0 | 59.0 | 61.0 | 60.0 |
| Example 1 | 61.0 | 60.0 | 59.0 | 60.0 | 60.0 | 60.0 |
| Example 2 | 59.0 | 61.0 | 59.0 | 59.0 | 58.0 | 59.2 |
| Example 3 | 57.0 | 57.0 | 60.0 | 59.0 | 58.0 | 58.2 |
| Initial value | 61.0 | 61.0 | 58.0 | 57.0 | 56.0 | 58.6 |
| Comparative Example 1 | 48.0 | 49.0 | 45.0 | 48.0 | 49.0 | 47.8 |
| Comparative Example 2 | 49.0 | 49.0 | 49.0 | 44.0 | 43.0 | 46.8 |
| Comparative Example 2 | 43.0 | 37.0 | 42.0 | 39.0 | 37.0 | 39.6 |

As will be understood from the foregoing description, the use of the air traps according to the present invention makes it possible to stabilize the discharge rate of the pumps of the cooling systems.

What is claimed is:

1. An air trap for liquid circulation line, comprising:
  a housing having a width dimension which is substantially constant along a length of the housing, the housing being provided at a proximal end thereof with a liquid inlet for receiving a liquid from the liquid circulation line and at a distal end thereof with a liquid outlet for the liquid flowing out of the liquid circulation line;

a container arranged in the housing and having a width dimension which is substantially constant along a length of the container, the width dimension of the container being smaller the width dimension of the housing thereby forming a space between the housing and the container, the space surrounding the container and extending from the proximal end to the distal end of the housing; the container communicating with the liquid inlet at a proximal end thereof and provided with a plurality of windows spaced at intervals along the length thereof;

an air reservoir arranged in the container; and a hydrophilic filter, which permits a liquid to permeate but does not permit bubbles to permeate and which is arranged in the air reservoir to separate an upstream side of the liquid circulation line from a downside of the circulation line, the filter being so arranged as to cover the plurality of windows of the container.

2. The air trap according to claim 1, wherein the filter has pores which meet conditions defined by equation:

$$P < 4h/d$$

where P represents a gas pressure, d is a diameter of the pores of the filter, and h is a surface tension of the liquid.

3. The air trap according to claim 1, wherein one the plurality of windows covered by the filter is formed on a distal end of the container.

4. The air trap according to claim 1, wherein a distal end of the container is closed.

5. The air trap according to claim 1, wherein the liquid passes from the air reservoir in the container to the space outside of the container.

6. An air trap for liquid circulation line, comprising:

a flat housing being formed of two substantially identical flat members each having a recessed portion formed on one side thereof and a cylindrical projection serving as a liquid inlet or a liquid outlet formed in an opposite side thereof, the two flat members being mated together with the recessed portions facing each other, and so that the liquid inlet and the liquid outlet are located axially symmetrical to each other, the liquid inlet and the liquid outlet for a liquid entering from or flowing out to the liquid circulation line on the opposite sides of the flat housing;

a space being formed by the recessed portions creating an air reservoir; and a hydrophilic filter partitioning said space and permitting the liquid to permeate but not permitting bubbles to permeate, the filter being arranged in the air reservoir to separate an upstream side of the liquid circulation line from a downside of the circulation line.

7. The air trap according to claim 6, wherein the filter has pores which meet conditions defined by equation:

$$P < 4h/d$$

where P represents a gas pressure, d is a diameter of the pores of the filter, and h is a surface tension of the liquid.

8. The air trap according to claim 6, wherein a depth of the recessed portions ranges from 0.1 to 4.0 mm.

\* \* \* \* \*